Dec. 6, 1966 F. LE TARTE 3,290,076
FRAME CORNER CONSTRUCTION
Filed Feb. 24, 1964 2 Sheets-Sheet 2
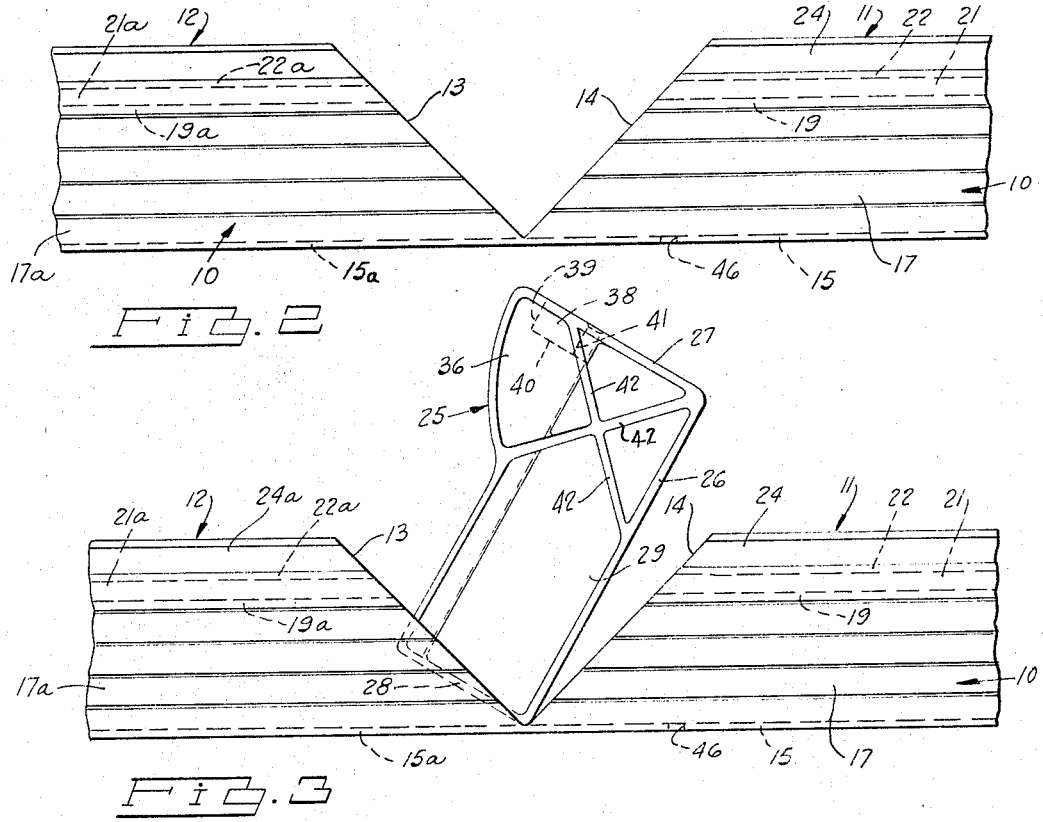
INVENTOR.
FRANK LeTARTE
BY
Donnelly, Mentag & Harrington
ATTORNEYS

United States Patent Office 3,290,076
Patented Dec. 6, 1966

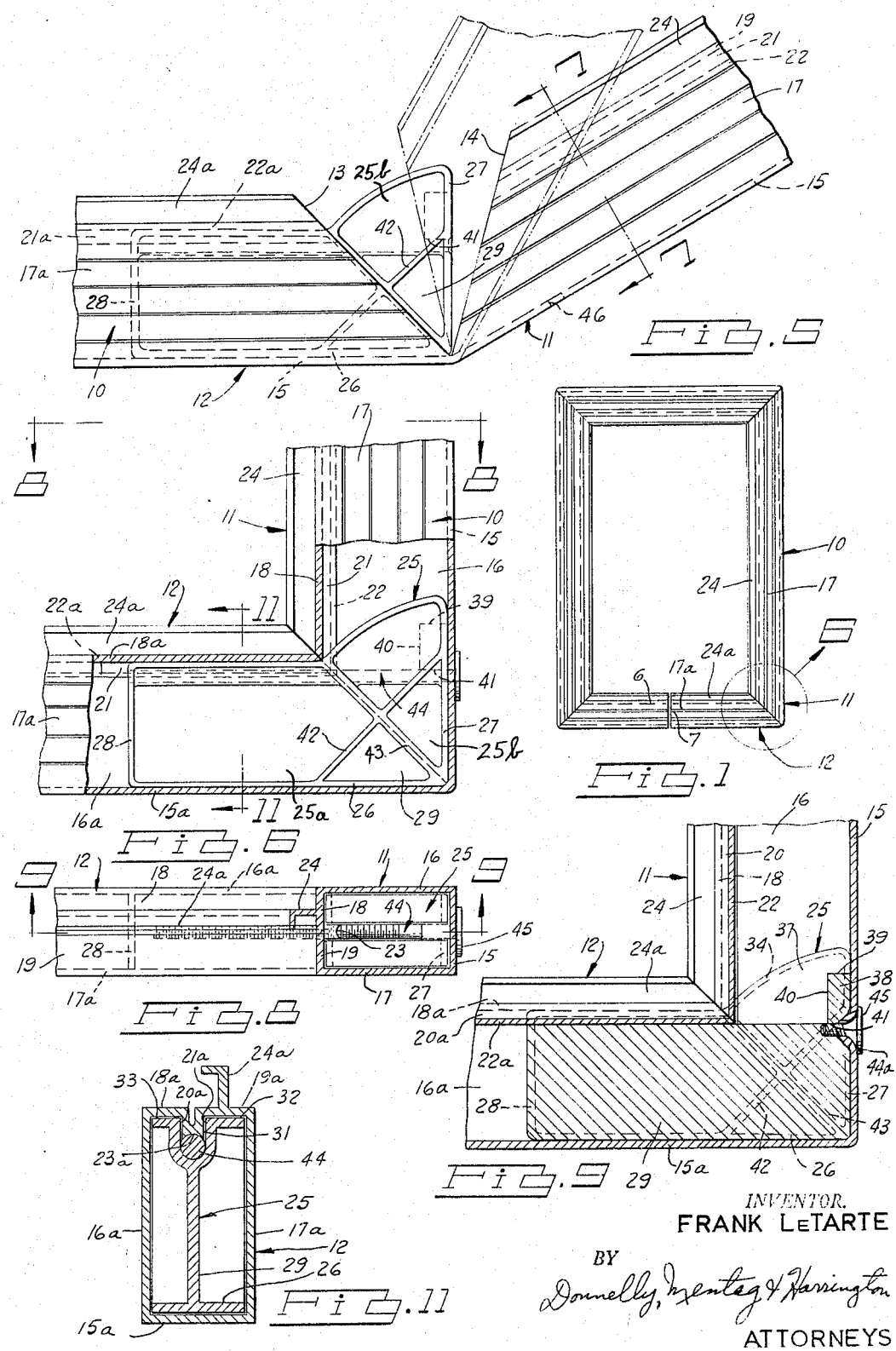

3,290,076
FRAME CORNER CONSTRUCTION
Frank Le Tarte, Wales Township, St. Clair County, Mich., assignor to Le Tarte Enterprises, Smith Creek, Mich., a co-partnership of Michigan
Filed Feb. 24, 1964, Ser. No. 346,813
10 Claims. (Cl. 287—189.36)

This application is a continuation-in-part of my application Serial No. 241,194 for Window and Door Frame Construction, filed November 30, 1962, now Patent No. 3,202,245.

This invention relates to frame corner construction and, more particularly, to frame corner construction for window frames, door frames, or the like, which employ metal or other extruded or molded material.

It is well known in the art that frames must be capable of withstanding bi-directional torques. For example, a door is subjected to an opening force exerted on the door handle and is subjected to opposing forces in the form of closure forces exerted by a closure or by springs mounted in the hinges. Similarly, window frames such as storm or screen window frames are subjected to smaller bi-directional forces when they are manually installed in the door, or window. Numerous attempts have been made to join mitered frame corner elements by mechanical means but most of these structures have resulted in corner structures which permit relative movements of the corner elements after subjecting the corner elements to bi-directional forces for relatively few times. Because frame construction is a highly competitive industry, any modifications of existing structure must not result in the use of more material to solve the problem; such a solution would result in a greater expense than could be justified in a highly competitive market. Further, any solution of the problem must provide greater support for the corner of the frames against these bi-directional torques without employing additional material, or labor.

Accordingly, it is a primary object of the present invention to provide a novel and improved corner construction for frames, or the like, which includes a pair of corner elements secured together in angular relationship by means of a gusset and a fastener which gusset is adapted to have a first portion mounted in a first one of the corner elements and a second depending portion extending angularly from said first portion and mounted in the second corner element, the fastener extending through the second corner element and engaging said gusset to provide a metallic contact therewith.

Another object of the present invention is to provide an improved corner construction for metallic frames which includes a pair of connected corner elements formed by notching a single hollow metal workpiece, inserting in the notch a gusset having a pair of angularly extending portions, folding one corner element over one portion of the gusset and fastening the corner by employing a fastener which extends through one corner element and engages a pair of opposing slot defining surfaces, one of which is on the inner surface of the other corner element, the other of which is on the gusset.

A further object of this invention is to provide a novel corner construction which employs a wrap-around corner including two elements formed by cutting a V-shaped notch in a hollow tubular workpiece, a gusset inserted in one element through the notch, the gusset including two angularly disposed portions, at least one of which has an arcuate periphery, folding the other element of the workpiece around the above-mentioned one portion of the gusset and fastening the elements by inserting a screw fastener through the other element into the gusset.

Still another object of this invention is to provide, in a wrap-around corner construction for a hollow rectilinear metal workpiece, a gusset in a notch in the workpiece providing the entire periphery of a fastener engaging surface whereby a fastener may be inserted through the workpiece adjacent one gusset portion and engage the gusset securely to fasten the frame corner.

Still another object of this invention is to provide a corner construction for a frame formed from a hollow rectilinear workpiece by cutting a notch in the workpiece and by inserting a gusset in the notch and folding the workpiece around the gusset, which gusset is formed of two angularly disposed portions, at least one portion having an arcuate periphery and a flat surface defining the plane of initiation of the generation of the arcuate periphery, which flat surface engages the inner surface of one of the outer portions of the workpiece and a fastener inserted through the last-mentioned outer surface of the workpiece and into engagement with the flat surface of the gusset to fasten the frame corner.

Yet another object of this invention is to provide a frame corner construction formed from a hollow workpiece by cutting a notch in the elongated workpiece and inserting a gusset into the notch and wrapping the workpiece around the gusset, which gusset is formed from two angularly disposed portions, the line of junction of the two angular disposed portions defining a positive stop shoulder for limiting the insertion of the gusset into the workpiece and for positively positioning the parts of the frame corner during assembly.

A further object of this invention is to provide, in combination with a wrap-around frame corner construction formed from a hollow elongated workpiece in which a notch is formed in the workpiece, a gusset inserted in the notch and the workpiece wrapped around the gusset to define an angular corner, which gusset is formed of two angularly disposed portions, one having an arcuate periphery, the radius of the arcuate periphery being substantially equal to the inside dimension of the portion of the workpiece folded around the gusset measured along the notch.

A still further object of this invention is to provide a frame corner construction employing a hollow elongated workpiece, forming a notch in the workpiece, inserting one portion of a gusset having a pair of angularly disposed portions into the workpiece and folding the workpiece around the other portion of the gusset, which gusset includes an "X-shaped" cross member frame defined by two angularly disposed legs, one leg of which prevents the joint formed between abutting edges of the workpiece from caving in and the other leg of which braces the corner and absorbs bi-directional torque loads on the corner.

Yet another object of this invention is to provide a frame corner construction formed from a hollow rectilinear workpiece by cutting a notch in the workpiece and inserting a gusset in the notch, which gusset has a pair of angularly disposed portions, one having an arcuate periphery and a pair of cross members, at least one of which defines a plane of connection between said angularly disposed portions and thereby supports the joint formed in said workpiece.

A further object of this invention is to provide a frame corner construction employing a hollow elongated workpiece, cutting a notch in the workpiece, inserting a gusset in the notch and wrapping the portions of the workpiece around the gusset, which gusset is formed by a pair of cross members defined by two legs, one leg of which supports the maximum torque to which the frame corner is subjected, the other leg preferably forming equal angles with the outer surfaces of the folded workpiece to thereby support the corner against transverse loads.

Other objects and advantages of this invention will hereinafter become more fully apparent from the following description of the annexed drawings, which illustrate a preferred embodiment, and wherein:

FIGURE 1 is a front elevational view of a metal window frame made in accordance with the principles of the present invention;

FIGURE 2 is a plan view, to an enlarged scale, of a portion of the extruded metallic frame of FIGURE 1 which has been notched to provide a pair of corner members or elements;

FIGURE 3 is a view similar to FIGURE 2 showing the start of an insertion of a gusset used in forming the corner construction of the present invention;

FIGURE 4 is a view similar to FIGURES 2 and 3, showing the gusset fully inserted in a first one of the pair of corner elements;

FIGURE 5 is a view similar to FIGURES 2, 3 and 4, showing a second corner element in a partially bent position during the process of bending the same into engagement with a first corner element to form a corner construction;

FIGURE 6 is a fragmentary elevational view of a corner frame construction made in accordance with the principles of the present invention, showing parts of the corner elements removed, and taken within the circle marked "6" in FIGURE 1, to an enlarged scale;

FIGURE 7 is a sectional view of the structure shown in FIGURE 5 taken along the line 7—7 thereof, and looking in the direction of the arrows;

FIGURE 8 is a top plan view of the structure illustrated in FIGURE 6, taken along the line 8—8 thereof, and looking in the direction of the arrows;

FIGURE 9 is an elevational sectional view of the structure illustrated in FIGURE 8, taken along the line 9—9 thereof, and looking in the direction of the arrows;

FIGURE 10 is a perspective view of the novel gusset employed in the corner construction of the present invention; and FIGURE 11 is an elevational sectional view of the structure illustrated in FIGURE 6, taken along the line 11—11 thereof, and looking in the direction of the arrows.

Referring now to the drawings and in particular to FIGURES 1 through 6, the numeral 10 generally indicates a frame preferably formed of extruded metal or other suitable molded or extruded material and provided with corner constructions made in accordance with the principles of the present invention. The corner construction within the circle marked "6" of the metal frame 10 shown in FIGURE 1 is shown in detail, to an enlarged scale, in the other figures in the drawings. The corner elements, members, or workpiece portions of the detailed one corner construction, as shown in FIGURE 1, are generally indicated by the numerals 11 and 12, and they are adapted to be joined along the notch lines 13 and 14. In the illustrative structure of FIGURES 1 through 9, the corner elements 11 and 12 have been formed by notching a continuous hollow rectilinear metal workpiece. The workpiece may be notched by any suitable method without cutting the outer end of the back wall 15 and then the workpiece is bent as indicated in FIGURE 5 to bring the corner element 11 into abutting engagement with the corner element 12 along the notch lines 13 and 14.

One suitable method for notching a tubular workpiece to form corner elements and folding or wrapping-around one corner element to form the mitered joint is disclosed in my prior Patent No. 3,097,684, issued July 16, 1963, and entitled, "Method of Forming a Closed Corner in a Hollow Rectilinear Metal Workpiece." The ends 6, 7 of the workpiece are joined in abutting relationship by a suitable fastener means, not shown, in any convenient manner such as the manner shown in my above-mentioned method patent. The wrap-around construction disclosed in the above-mentioned patent and herein, and the novel gusset of the instant invention result in a stronger corner than known corner constructions.

As shown in FIGURE 7, the corner element 11 has a closed, generally rectangular cross section, including the outer end wall 15, the integral spaced apart side walls 16 and 17, and the integral irregularly shaped inner end wall comprising the parts indicated by the numerals 18, 19, 20, 21 and 22. The corner element 12 is similarly formed since it is made from the same continuous workpiece and the corresponding parts are marked with the same reference numerals followed by the small letter "a."

The inner end wall portions 18 and 19 are integrally connected to the side walls 16 and 17 and are disposed perpendicular thereto and extend inwardly toward each other in the same vertical plane. The inner end wall portions 20 and 21 are integrally formed on the inner ends of the wall portions 18 and 19. The inner wall portions 20 and 21 extend parallel to each other, inwardly of the tubular cross section of the workpiece and they extend toward the outer end wall 15 to define the sides of a U-shaped notch into which the edge of a panel, such as a kickplate, may be inserted. The inner ends of the wall portions 20 and 21 are interconnected by the base of the U which is the integral wall portion 22, disposed parallel to the wall portions 18 and 19. Wall portion 22 is provided on the inner face thereof with the longitudinally extended, concave surface 23 which is adapted to provide a portion of an elongated screw channel for self-threading engagement with a screw or threaded fastener which will be more fully described in detail hereinafter. The numeral 24 is a longitudinally extended L-shaped metal strip which is integrally formed on the inner wall portion 18 and which extends inwardly of the metal frame and is adapted to have secured thereto the frame of a metal screen or the like.

As shown in FIGURES 3–6, 8, 9, 10, the numeral 25 generally indicates the novel and improved gusset used in making a corner frame construction in accordance with the principles of the present invention. The gusset 25 is substantially L-shaped in overall side configuration, with the longest or first leg of the L comprising a base portion. Stated in another manner, the gusset is formed with two integral, angularly depending portions, 25a, 25b, joined along a 45° plane, or a plane bisecting the corner angle. The gusset base portion includes the lower end flange 26 to which is integrally connected the outer end, vertically extended flange 27, and an inner end, vertical integral flange 28. As shown in FIGURES 10 and 11, the gusset 25 further includes the centrally disposed, longitudinally extended, integral central wall or web 29 which is enlarged along the upper end of the gusset, as indicated by the numeral 30. A longitudinally extended U-shaped hole or slot 31 is formed in the enlarged wall portion 30 for the reception of a threaded connector, as more fully described hereinafter. The gusset 25 is further provided with a first set of spaced apart upper or top flanges 32 and 33 which are disposed on opposite sides of the threaded connector receiving slot 31, and which extend from the inner end of the gusset for a distance inwardly, and past the central portion of the gusset, toward the outer end thereof.

As best seen in FIGURES 4 and 10, the L-shaped gusset 25 is provided with the outer upwardly extended end portion which forms the second leg of the L shape, or the second angularly depending portion, and which is adapted to extend into a second corner element after the aforedescribed lower horizontally disposed base portion, or first angularly depending portion, has been inserted into a first corner element. The outer end flange 27 extends upwardly above the horizontal first set of top flanges 32 and 33 which are disposed on the inner end of the base portion of the gusset and which terminate at the outer ends of the arcuate second set of top end flanges 34 and 35. Advantageously, flanges 34, 35 are generated from flange 27 with a radius substantially equal to the length of the V-shaped notch measured along the inside of corner element 11 so that wall portions 18, 19 just clear flanges 34, 35. This shape of flanges 34, 35 gives the gusset 25 the maximum possible "reach" into element 11 if the wrap-around construction is employed and thus gives the maximum possible support against bi-directional torques. The inner ends of the curved top end flanges 34 and 35 terminate along a line at the outer ends of the flanges 32 and 33 to define a positive stop which limits the insertion of gusset 25 into member 12. The central enlarged wall portion 30 extends upwardly into the second leg or outer vertical end portion of the gusset, as indicated by the numeral 36. The outer upper end of the gusset is slotted as indicated by the numeral 37 in FIGURE 10, and this slot extends downwardly and communicates with the U-shaped slot 31.

The slot 37 is partly filled along the outer lower portion thereof as indicated by the numeral 38. The member 38 is substantially rectangular in cross section and terminates at the upper end thereof at the point indicated by the numeral 39 and on the inner end thereof at the point indicated by the numeral 40. Formed through the lower end of the portion 38 is a hole 41 for insertion of the threaded connector, as more fully described hereinafter. Advantageously, the gusset 25 is provided on the lower or base portion thereof with a pair of diagonally disposed flanges 42 and 43, or cross member framing legs which are crossed to form an X, on each side of the central wall 29, as shown in FIGURES 3 and 10. The lower ends of the flanges 42 terminate intermediate flanges 26 and preferably flange 42 defines equal angles with flanges 26, 27. The lower ends of the flanges 43 terminate at the juncture point of the flanges 26 and 27 and preferably bisect the angle defined thereby. Framing legs 43 support the abutting edges of 13, 14 of members 12, 11, respectively, while legs 42 support transverse corner loads. Both sets of X framing legs support the corner construction against bi-directional torques.

In the assembling of two corner elements and the gusset 25 to make a corner construction in accordance with the principles of the present invention, the gusset 25 is disposed as shown in FIGURE 3 so that the base portion may be inserted into a first one of the corner elements, as for example, the corner element marked by the numeral 12. The gusset 25 is moved inwardly or to the left as shown in FIGURES 3 and 4. The U-shaped slot 31 of the gusset 25 is made to a size so as to slidably receive the inner wall portions 20a, 21a, and 23a of the corner element 12. The gusset 25 is moved into the corner element 12 until the positive stop defining line termination of flanges 32, 33 and top flanges 34, 35 abut wall portions 18a, 19a of element 12, or until the entire angularly depending portion 25a is within element 12. FIGURE 11 illustrates the inter-engagement of the corner element 12 with the gusset 25.

After the gusset 25 has been moved into the position shown in FIGURE 4 the second corner element 11 is rotated over the second leg, or angularly depending portion 25b, of the gusset 25 and into the position shown in FIGURES 6, 8 and 9 by bending outer wall 15 until edges 13, 14 abut. The wall portions 18, 19 also abut the previously mentioned positive stop defined by the line termination of flanges 32, 33 and 34, 35. The wall portions 20, 21 and 23 of the corner element 11 also enter the inner end of the slot 37 between the top end flanges 34 and 35 as seen in FIGURES 6 and 9. It will be seen that the gusset 25 is securely interlocked with both of the corner elements when the corner assembly is fastened and the corner construction so formed is adapted to accommodate side loading forces without injury to the assembled corner elements.

After the gusset 25 has been assembled into the corner elements one embodiment of threaded screw or connector 44 may be threaded through the hole 45 in the corner element wall 15 and through the hole 41 in the gusset 25. The threaded portion of the screw 44 engages the curved surface of the lower end of the U-shaped slot 31 and the curved surface 23a of the corner element 12 and self-threads itself into said curved surfaces to securely hold the two corner elements and the gusset 25 in a rigid corner construction. The screw 44 is threaded into the corner construction until the head of the same, namely part 45 engages the corner element wall 15 and preferably until the head of screw 44 pulls tangent portions of wall 15 into the recess in flange 27. The screw 44 is fully encased in the gusset 25.

Because of the supporting features of the novel gusset 25, it is not essential that the fastener engage more than one corner member. For example, fastener 44a, shown in FIGURE 9, passes through wall 15 into flange 27 of gusset 25. The combination of flange 27 and portion 38 defines an enclosure for the periphery of fastener 44a. When fastener 44a is fully inserted, as shown in FIGURE 9, the corner construction is completed and is capable of withstanding bi-directional torques and diagonal transverse loads on the corners, i.e., loads in the plane of the drawing and particularly loads in the plane of the drawing along the line of flange or leg 42.

Experience has shown that the corner joint construction of the present invention provides a rigid and economical joint structure for door, window and other type frames. The corner structure of the present invention provides engagement of the screw 44 on all sides thereof in the corner element 12 to provide a strong construction. The surface of flange 27 prevents caving-in of the outer wall 15 of the one corner element 11 through which the screw 44 is mounted and provides the complete fastener peripheral engagement when screw 44a is employed. The novel corner construction of the present invention also eliminates any sliding between the mitered ends of the corner elements of the frame construction.

While it will be apparent that the preferred embodiments of the invention herein disclosed are well calculated to fulfill the objects above stated, it will be appreciated that the invention is susceptible to modification, variation and change without departing from the proper scope of fair means of the subjoined claims.

What is claimed is:

1. In a frame corner construction, the combination comprising:

a hollow rectilinear workpiece having at least one V-shaped notch therein to form said workpiece into first and second members connected at the apex of said notch by a workpiece wall portion;

a gusset inserted in said notch and having a pair of integral angularly disposed portions, one gusset portion extending into said first member, the other gusset portion extending angularly beyond said one gusset portion to engage said second member when said second member is folded about said apex toward said notch until the edges of said notch are in abutting relationship, said other gusset portion having a length as measured from said apex which is less than the length of one edge of the notch measured on the inside of the hollow workpiece, said other gusset portion including shoulder means located in a plane bisecting the angle formed by the junction of said gusset portions and defining a positive stop for limiting the depth of insertion of said one portion of said gusset into said one member; and, fastener means extending through said first member and frictionally engaging said second member and said other of said gusset portions.

2. The combination according to claim 1 wherein said other gusset portion has an arcuate periphery, the radius of which is substantially equal to the length of the edge of the notch measured on the inside of the hollow workpiece.

3. The combination according to claim 1 wherein said fastener means includes a screw having a head thereon engaging said first member and said other gusset portion includes a flat surface abutting the inner surface of the outer wall of said second member to reinforce said outer wall in the region of said head.

4. The combination according to claim 1 wherein said gusset includes a first transverse planar leg member for supporting the abutting edges of said notch.

5. The combination according to claim 4 wherein said gusset further comprises a web transversely intermediate said one portion and extending longitudinally thereof, and a second transverse planar leg member angularly disposed to said first leg member and formed integrally therewith and defining a support for said construction against bi-directional torques.

6. The combination according to claim 5 wherein said second leg member defines equal angles with the outer walls of said workpiece members when said edges of said notch are in abutting relationship.

7. In a frame corner construction, the combination comprising:

a pair of corner elements of hollow rectangular cross-section each having a longitudinal tongue projecting inwardly relative to said hollow cross-section, said elements being connected by an integrally-formed outer wall portion, said elements being disposed in abutting angular relationship;

an L-shaped gusset having a base portion mounted in a first one of said corner elements and a leg portion mounted in the other of said pair of corner elements and extending transversely from and beyond said base portion to define a positive stop for said gusset, said positive stop lying in a plane substantially bi-secting the angle formed by said gusset portions, said base portion having a U shaped groove extending longitudinally of one side thereof and mating with the tongue of said first corner element to define an elongated aperture; and, fastener means connected through the other of said pair of corner elements and frictionally engaging said U-shaped groove and the tongue of said first corner element.

8. The combination according to claim 7 wherein said leg portion includes a pair of spaced, parallel members each having arcuate outer wall portions and each having a radius as measured to the apex of said corner elements which is less than the interior diagonal dimension of said corner construction measured at the junction of said corner members.

9. In a wrap around frame corner construction in which a first and a second hollow corner member connected by an integral wall are formed by notching an elongated workpiece, and are secured by a gusset and a fastener, said gusset comprising a first and a second flange connected to define the frame corner angle and a first and a second integral angularly depending portion connected together in a planar flange member substantially bisecting the frame corner angle, each depending portion including one of said angle defining flanges, one of said depending portions having an arcuate periphery, the radius of which is less than the length of one edge of one of said corner members, measured along the inside of said hollow member.

10. The gusset according to claim 9 wherein said gusset includes an additional flange member forming an X with said planar flange member and defining substantially equal angles with said first and said second flanges and a centrally disposed wall, one edge of said wall terminating in a U-shaped slot, said fastener threadably engaging a portion of said slot.

References Cited by the Examiner

UNITED STATES PATENTS

| | | | |
|---|---|---|---|
| 923,810 | 6/1909 | Budd | 189—36 |
| 2,004,727 | 6/1935 | Keller | 189—36 |
| 3,009,516 | 11/1961 | Albee | 189—76 |
| 3,202,245 | 8/1965 | Tarte | 189—36 |

HARRISON R. MOSELEY, *Primary Examiner.*

J. K. BELL, *Assistant Examiner.*